(12) United States Patent
Tyler

(10) Patent No.: US 7,635,431 B1
(45) Date of Patent: Dec. 22, 2009

(54) SEPTIC DRAIN LINE FLOW CONTROL SYSTEM

(76) Inventor: James H. Tyler, 35 Casino La., Franklinton, NC (US) 27525

( * ) Notice: Subject to any disclaimer, the term of this patent is extended or adjusted under 35 U.S.C. 154(b) by 268 days.

(21) Appl. No.: 11/306,642

(22) Filed: Jan. 5, 2006

Related U.S. Application Data

(60) Provisional application No. 60/593,356, filed on Jan. 7, 2005.

(51) Int. Cl.
*C02F 3/00* (2006.01)
*F16K 31/18* (2006.01)
*F16K 33/00* (2006.01)

(52) U.S. Cl. ............... 210/605; 210/747; 210/532.2; 210/123; 210/170.08; 210/128; 210/242.1; 137/434

(58) Field of Classification Search .............. None
See application file for complete search history.

(56) References Cited

U.S. PATENT DOCUMENTS

| | | | | |
|---|---|---|---|---|
| 252,195 A | * | 1/1882 | Decker | 137/430 |
| 2,375,806 A | * | 5/1945 | Mck Martin | 137/434 |
| 2,716,422 A | * | 8/1955 | Whitlock, Jr. | 137/391 |
| 3,545,617 A | * | 12/1970 | Wellington | 210/109 |
| 4,230,578 A | * | 10/1980 | Culp et al. | 210/86 |
| 4,501,665 A | * | 2/1985 | Wilhelmson | 210/630 |
| 4,824,572 A | * | 4/1989 | Scott | 210/602 |
| 4,919,814 A | * | 4/1990 | Carnahan et al. | 210/603 |
| 5,102,535 A | * | 4/1992 | Grohmann | 210/104 |
| 5,427,679 A | * | 6/1995 | Daniels | 210/170.08 |
| 5,645,105 A | * | 7/1997 | Grayson | 137/430 |
| 5,895,569 A | * | 4/1999 | Connelly | 210/170.08 |
| 6,562,236 B2 | * | 5/2003 | Rylander et al. | 210/605 |
| 6,749,743 B1 | * | 6/2004 | Rohrer et al. | 210/97 |

* cited by examiner

*Primary Examiner*—Krishnan S Menon
*Assistant Examiner*—Madeline Gonzalez
(74) *Attorney, Agent, or Firm*—Ishman Law Firm P.C.

(57) ABSTRACT

A flow control device for the drain lines of a septic system interrupts the flow in the event the proximate water table rises to a level of over-saturation resulting in the effluent flow being directed to the remaining drain lines. Each drain line is provided with a control box having a float controlled inlet valve having an open position allowing flow to the drain line. When the drain line cannot handle the required flow rate or when the proximate water table rises, the float shifts the valve toward a closed position, thereby redirecting the flow to the remaining lines.

9 Claims, 8 Drawing Sheets

SEPTIC DRAIN LINE FLOW CONTROL SYSTEM

RELATED APPLICATION

This application claims the benefit of U.S. Provisional Application No. 60/593,356 filed on Jan. 7, 2005 in the name of James Tyler and entitled "Septic System Flow Control Box".

FIELD OF THE INVENTION

The present invention relates to drainage systems and, in particular, to a system for controlling the flow of effluent in septic drain lines.

BACKGROUND OF THE INVENTION

Septic systems for handling the effluent from structures terminate in buried fields of drain pipes for leaching the effluent into the ground. Notwithstanding careful installation, the elevations and pitches of the drain pipes vary, resulting in a lesser number of drain pipes preferentially handling the output. Under adverse conditions, the ground surrounding the active pipes can become saturated resulting in the effluent penetrating and contaminating the ground surface. Such conditions do not affect the operation of the septic system and may not be apparent to the structure users in order to undertake the necessary maintenance or repair. If normal drainage cannot be restored, a separate secondary system may be required. Also, during the course of structure occupancy, the effectiveness of the original septic system may be compromised for other reasons, such terrain modification, additional capacity demand through site or population expansion, and changes in regulatory requirements and the like. It is thus common to include plans for such secondary or even tertiary systems. Generally, when required the original system is bypassed and the secondary system utilized for the current demands, even though the primary system may retain limited functionality. Further, suitable supplemental drainage may be available only at site elevations higher than the structure discharge elevation, requiring a separate pressurized system with pumping capabilities for transferring the effluent to the raised drain field location.

It would thus be desirable to provide a comprehensive septic system that avoids the above mentioned problems occasioned by temporary or substantial impairment of the original system and to utilize the total available capacity of the overall installation.

SUMMARY OF THE INVENTION

The present invention provides a flow control device for the drain lines of a septic system that interrupts the effluent flow in the event the proximate water table rises to a level of over-saturation thereby directing the effluent flow to the remaining drain lines. Each drain line is provided with a control box having a float controlled inlet valve having an open position allowing flow to the drain line. When the drain line cannot handle the required flow rate or when the proximate water table rises, the float shifts the valve toward a closed position, thereby redirecting the flow to the remaining lines. Multiple drain fields may be coupled thereby utilizing the available capacity of all the installed fields, rather than conversion to a separate system. To assist in sensitive opening and closing, the inlet valve may be provided with a progressively opening and closing sliding valve. During opening, the sliding valve provides an initial pilot valve opening to relieve line pressure followed by main valve opening to provide volumetric flow. During closing, the pilot valve initially closes and the float in conjunction with inlet line pressure moves the valve to a pressure biased closed position.

Accordingly, it is an object of the invention to provide a control system for limiting the flow to a septic drain line under conditions of reduced capacity to avoid ground saturation or penetration.

A further object is to provide a control system for the drain fields in a septic system wherein effluent flow is routed to other drain lines in response to conditions denoting impaired capacity.

Another object is to provide a septic line drain system wherein supplemental capacity can be added without disabling the original installation.

Another object is to control box for septic drain fields wherein a float controlled valve assembly progressively opens and closes to regulate flow from the septic system to the drain lines.

BRIEF DESCRIPTION OF THE DRAWINGS

The above and other features and advantages of the present invention will become apparent upon reading the following description taken in conjunction with the accompanying drawing in which.

DESCRIPTION OF THE PREFERRED EMBODIMENTS

Figure 1:
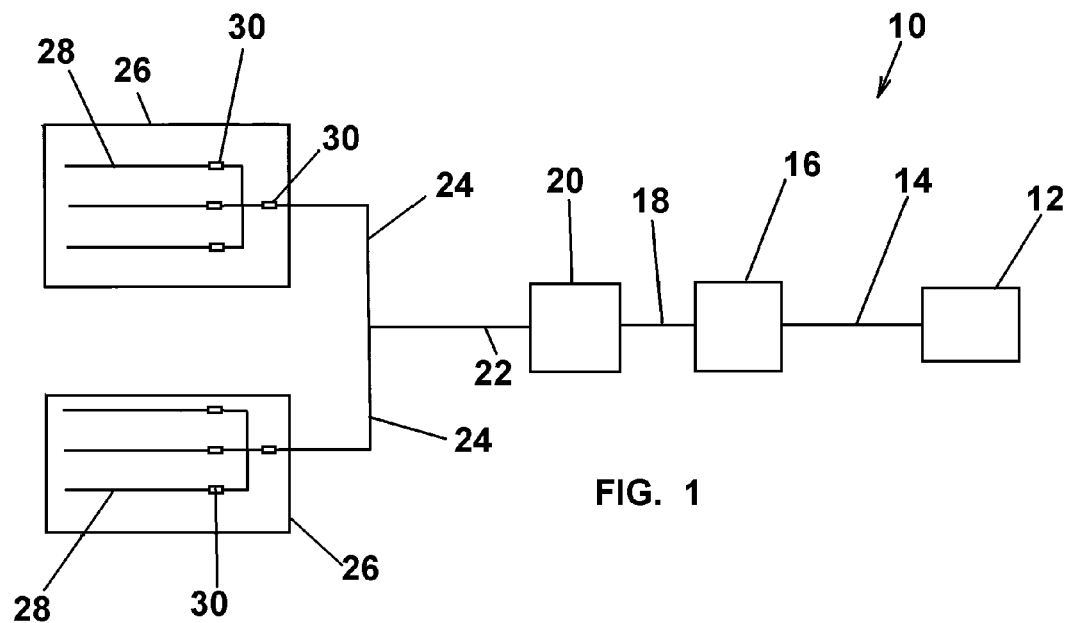
FIG. 1 is a schematic diagram of a septic drain line control system according to an embodiment of the invention.

Referring to FIG. 1, there is shown an embodiment of septic drain line control system 10 having a septic system for handling effluent from a structure 12. The effluent is serially routed from the structure 12 along line 14 to a septic tank 16.

After settling, the effluent is routed along line 18 to a distribution box 20. From the distribution box 20, the effluent is routed along main outlet line 22 to feed lines 24 in drain fields 26. Branch lines 28 are connected in parallel with the respective feed lines 24.

Each branch line 28, and optionally the associated feed line 24, is provided with a control box 30 for controlling effluent distribution to the branch line 28 in accordance with the prevailing proximate effluent water table.

Figure 2:
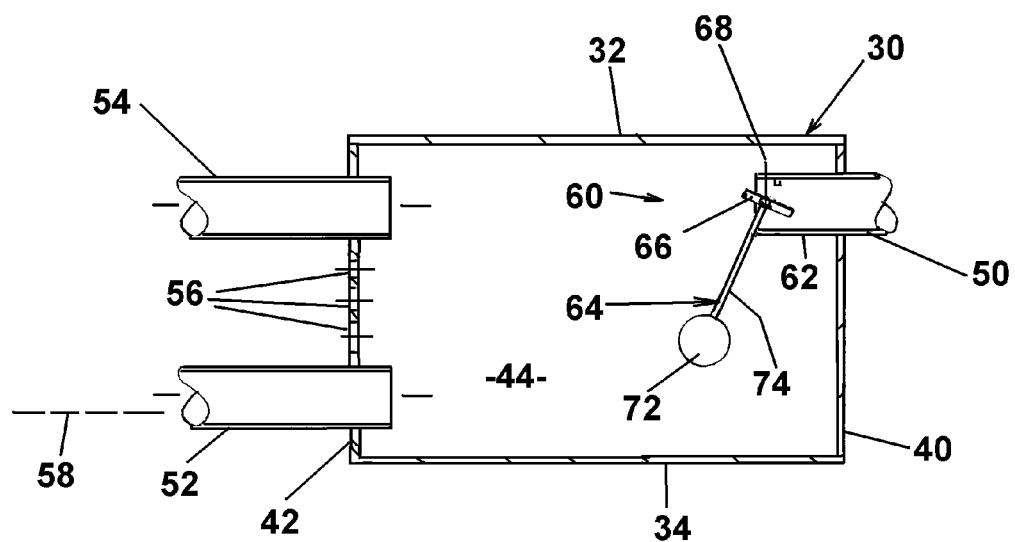
FIG. 2 in a vertical cross sectional view of the control box for the septic drain line control system of FIG. 1 with the float valve in the open position.
Figure 3:
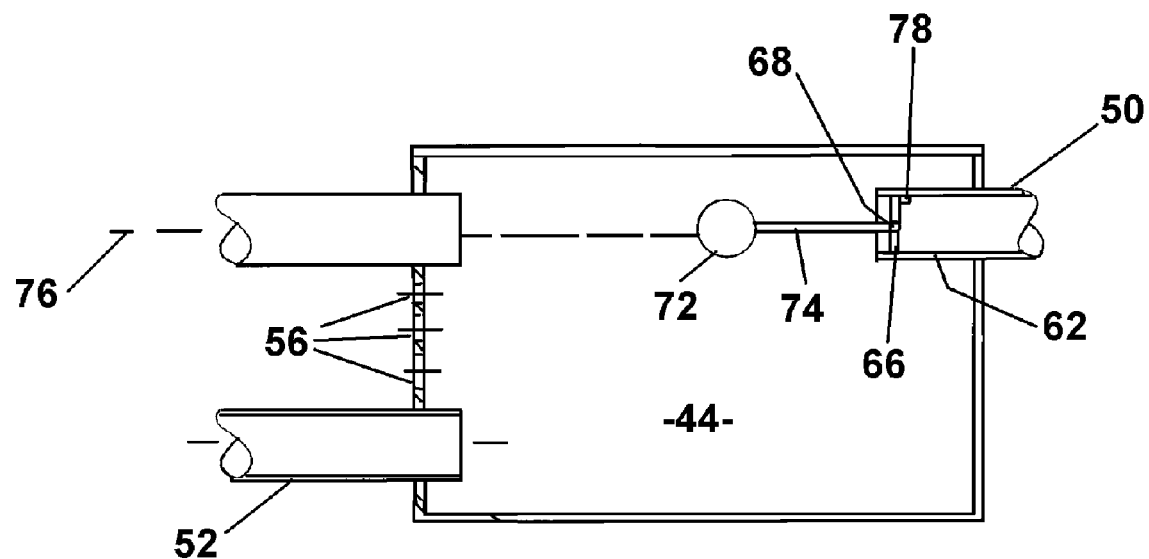
FIG. 3 is an enlarged cross sectional view of the float valve of the control box of FIG. 2 with the float valve in the closed position.
Figure 4:
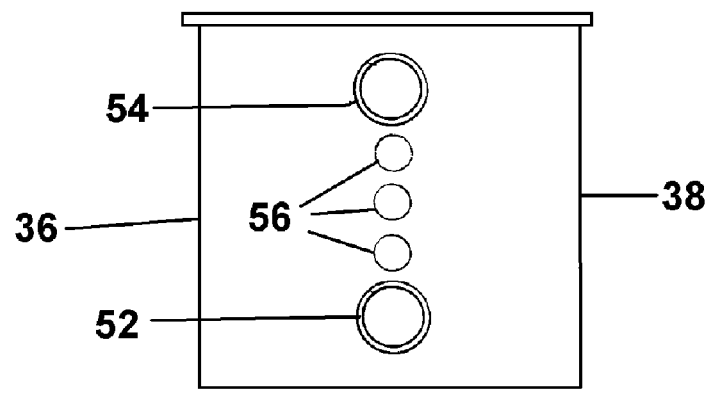
FIG. 4 is an end view of the distribution box of the control system.

Referring to FIGS. 2 through 4, the control box 30 is a rectangular hollow body having vertically spaced top and bottom walls, 32, 34 respectively, transversely spaced side walls 36, 38 and laterally spaced end walls 40, 42, the inner surfaces of which define a fluid chamber 44.

An inlet line 50 is disposed at the upper center end of end wall 40 and is fluidly connected with feed line 24. A main outlet line 52 in disposed at the lower center end of end wall 42 and is fluidly connected with branch line 28. A secondary line 54 is disposed at the upper center of the end wall 42 and terminated with a ground port for facilitating monitoring and inspection. A plurality of vertically extending weep holes 56 are formed in the box, preferably in the end wall 42, or other locations on the walls. In installation, the control box 30 is disposed in a subterranean cavity of surrounding drain stones. In normal operation, the normal effluent table level 58 is adjacent or below the bottom wall 38 and the effluent in the cavity 44 drains freely through main outlet line 52 for distribution along the length of the branch line 28.

A float control valve assembly 60 is disposed in the box inlet line 50, as a subassembly or unitized assembly. The control valve assembly 60 includes a flow pipe 62, and a float assembly 64. The float assembly 64 includes a circular valve disc 66 rotatably supported in the flow pipe 62 by horizontal pivot shaft 68. A float assembly 70 including a hollow float 72 is operatively connected by arm 74 to the valve disc 66 and shaft 68. Under normal drainage conditions with the normal water table, the float 72 pivots downwardly until the arm 74 engages the end of the pipe 62 and the valve disc 66 is in the illustrated open position.

Referring to FIG. 3, when the water table rises indicative of reduced proximate drainage, the surrounding water flows through holes 56 gradually raising the water level in the cavity to a raised level 76 and moving the valve disc 66 to a closed position blocking the flow of effluent from the distribution tank to the controlled drain line(s). Further pivoting of the disc 66 is blocked by a stop 78 on the inner end of the pipe 62. Sealing gaskets may be employed to further reduce leakage in the closed position. Thereafter, flow from the distribution tank will be preferentially routed to remaining open branch lines. If the water level recedes, the valve assembly will gradually open to resume distribution. In the event sufficient valves close, the effluent will back up to the control box in the line 24 associated with the affected field thereby closing the valve thereat and routing flow to the other field. If both fields are saturated, the effluent will backup through the distribution tank and septic tank and resultantly to the structure, whereat the lack of drainage will effectively signal the need for maintenance or other curative action.

During the course of structure occupancy, the effectiveness of the original septic system may be compromised for various reasons, such as reduction in percolation of the drain lines due to contamination, terrain modification, additional capacity demand through site or population expansion changes in regulatory requirements and the like. It is thus common to include plans for secondary or tertiary systems. Generally, when required the original system is bypassed and the secondary system utilized for the current demands, even though the primary system retains limited functionality. Further, suitable drainage may be available only at site elevations higher than the structure discharge elevation, requiring a separate pressurized system with pumping capabilities for transferring the effluent to the raised drain field location.

Figure 5:
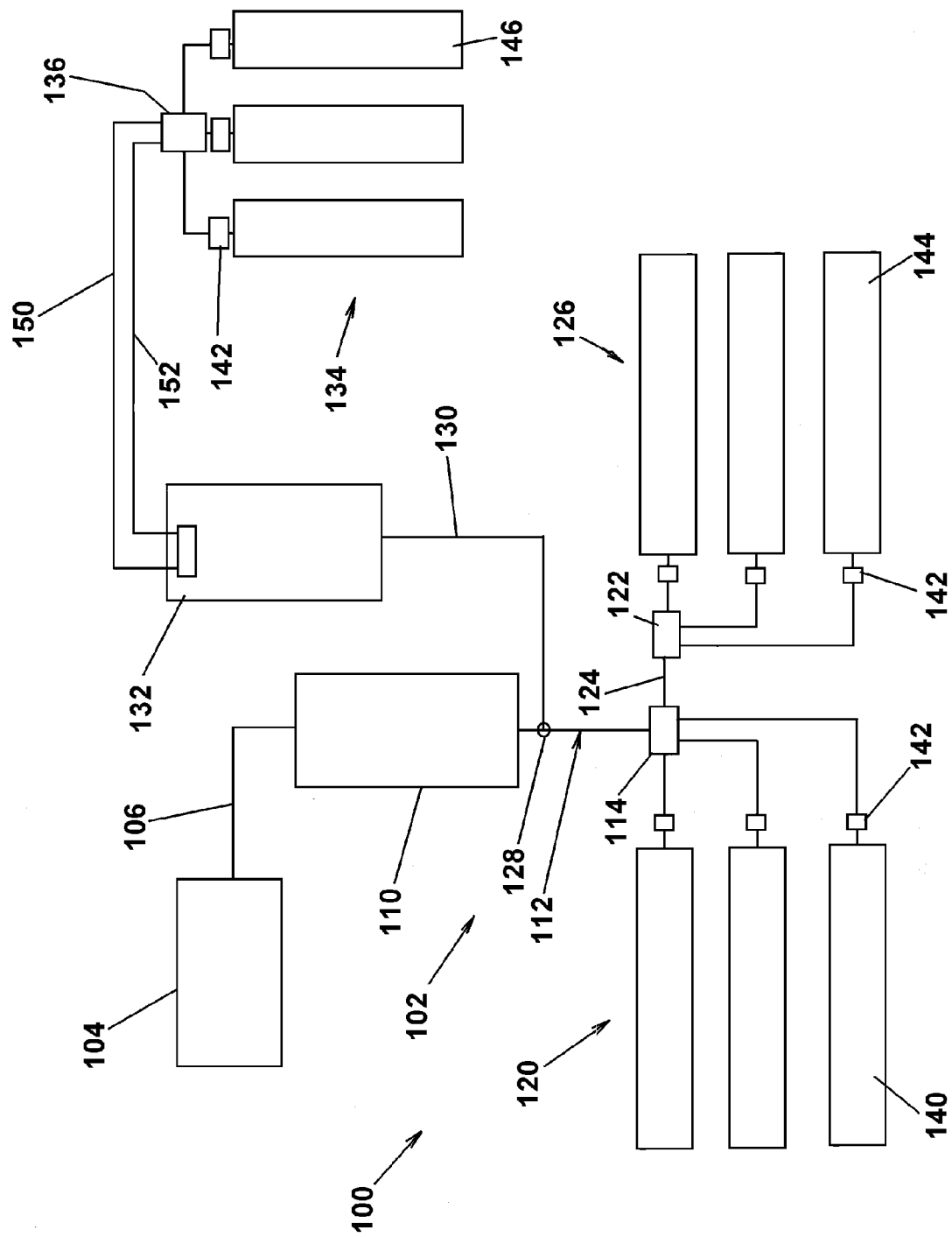
FIG. 5 is a schematic diagram of a septic drain line control system according to another embodiment of the invention.

A further embodiment for effectively handling the foregoing contingencies is shown in FIGS. 5 through 8. Referring to FIG. 5, a septic line drain control system 100 having a septic system 102 for handling effluent from a structure 104 discharged on outlet line 106. The septic system 102 includes a main tank 110 having an inlet connected to the outlet line 106 and an outlet connected to a main distribution line 112. The main distribution line 112 is connected with a primary distribution box 114 for selectively routing settled effluent from the main tank 110 to an original or primary drain system 120. If flow to the primary drain system is blocked or limited, the flow from the primary distribution box 114 is routed to a secondary distribution box 122 along connector line 124 for routing to a secondary drain system 126. The main distribution line 112 includes a Tee fitting 128 upstream of the primary distribution box 126 for routing effluent under conditions described below along branch line 130 to a secondary septic tank 132 for the pressure assisted delivery of effluent to a tertiary drain system 134 including a tertiary distribution box 136.

The primary drain system 120 includes drain fields 140, each of which is fluidly connected to the primary distribution box 114 by a branch line 141 including a control box 142. The secondary drain system 126 includes drain fields 144, each of which is connected to the secondary distribution box 122 by a control box 142. The tertiary drain system 134 includes drain fields 146 connected to the tertiary distribution box 136 by a control box 142. The distribution box 136 is connected with the tank 132 by a supply line 150 and a return line 152.

Figure 6:
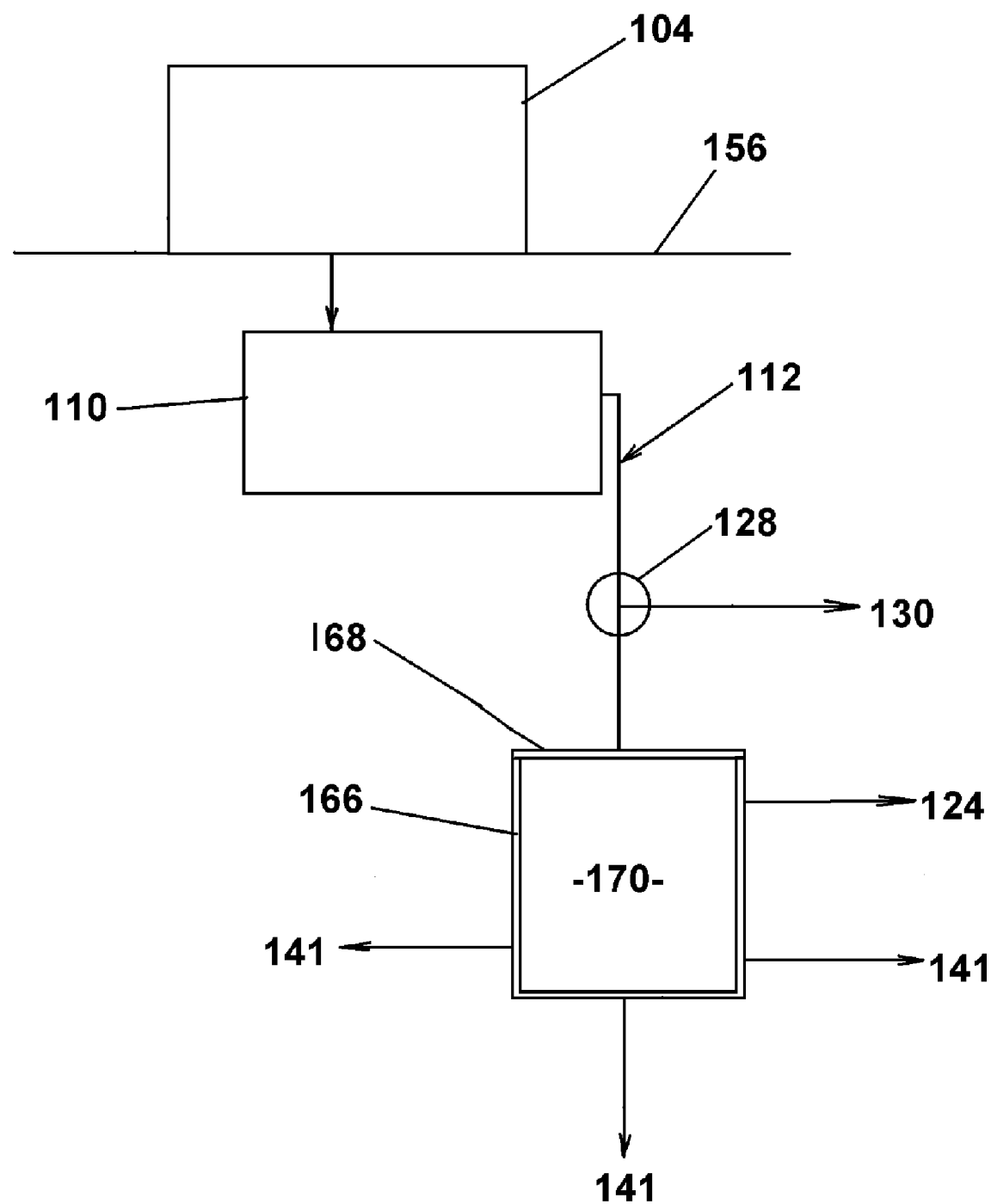
FIG. 6 in a schematic elevational view of the control system of FIG. 5.

Referring to FIG. 6, the main distribution line 112 flows downwardly below the ground 156 from the septic tank 110 to the Tee fitting 128 to the primary distribution box 114 with the indicative relative elevations as depicted. The box 114 comprises a thin walled container 166 covered by a lid 168 defining an interior cavity 170. Three outlet branch lines 141 fluidly connect the cavity 170 with the respective drain fields 140. The connector line 124 connects the primary distribution box 114 with the secondary distribution box 122. The secondary distribution box 122 and the tertiary distribution box 136 are similar in construction, with the exception that the connector line connection is not utilized. Where the primary drain field 120 is the preferential drainage path, the branch lines 141 are lower than the connector line 124 whereby available flow is thereto as the liquid level in the cavity rises until routed along the connector line to the secondary field. If the preferences are reversed, the relative elevations are reversed.

Figure 8:
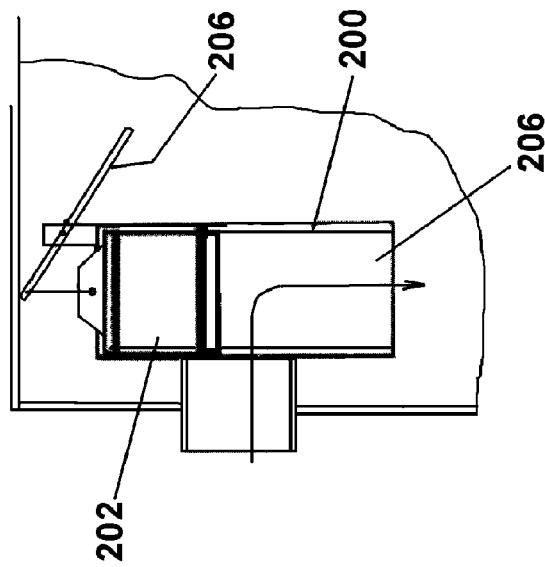
FIG. 8 is a fragmentary cross sectional view of the control box of the control system of FIG. 5 with the float valve in the open position.
Figure 7:
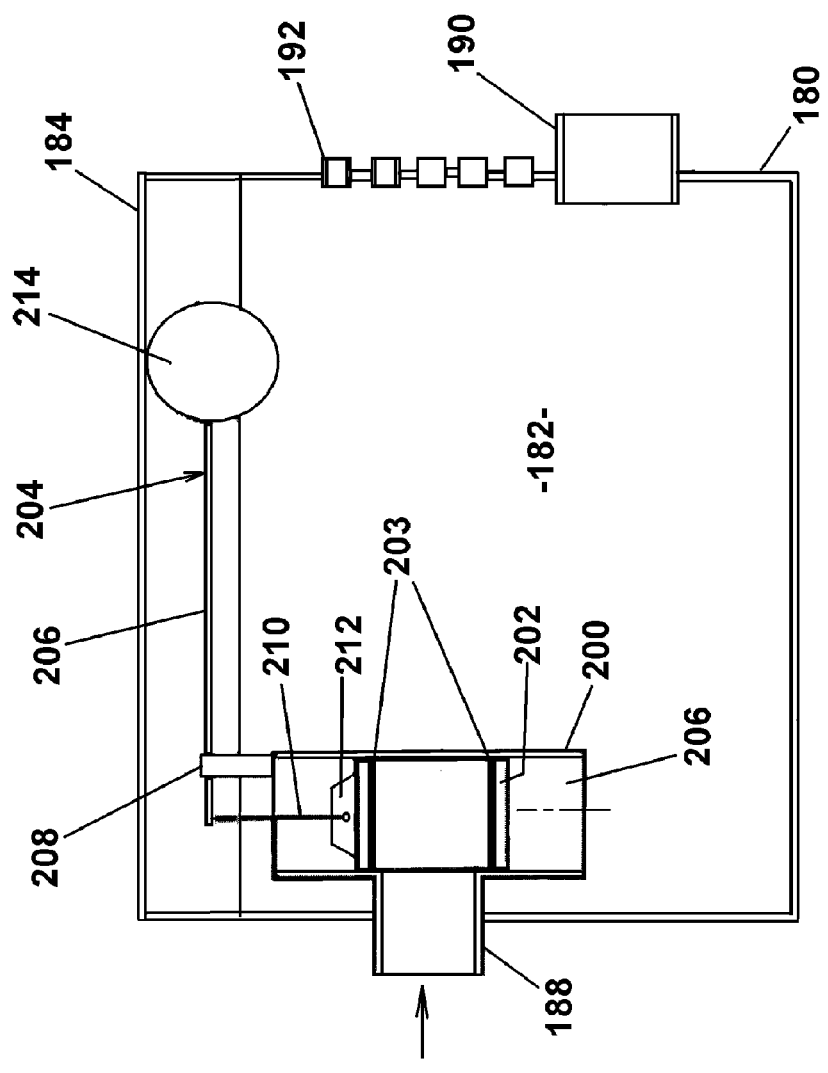
FIG. 7 is a cross sectional view of the control box of the control system of FIG. 5 with the float valve in the closed position.

As representatively shown in FIGS. 7 and 8, the outlet lines from the various distribution boxes are connected with a control box 142. The control box 142 includes a generally thin wall base 180 having bottom and side walls defining an upwardly opening cavity 182 closed by a cover 184. A control valve assembly 186 is mounted within the cavity 182 on a side wall and connected with a branch line 188 from a related distribution box. A feed line 190 is provided to route effluent to a connected field. Vertical weep holes 192 are provided on the side walls for reflecting proximate water table level in the cavity and for modulating the control valve assembly based thereon and exit flow.

The control valve assembly includes a T-shaped valve body 200 slidably supporting a slide valve member 202 including sealing rings 203. The valve member 202 is actuated between an open position shown in FIG. 8 and a closed position shown in FIG. 7 by a float assembly 204. The valve body 200 has a vertical bore 206 receiving the valve member 202 that is intersected by a center horizontal passage 208 connected with the line 188. The float assembly 204 includes a float arm 210 pivotally connected at a center portion to a vertical bracket 212 at the top of the valve body 200 and pivotally connected at an inner end to an actuator rod 214 connected to a tab 216 on the top of the valve member 202, and supporting a float 218 on an outer end whereby the float rises and lowers in response to the fluid level in the cavity 182 to shift the valve member 202 between the open position and the closed position thereby controlling the flow of effluent from the outlet line through the valve body passage into the cavity for routing through line 190 to the associated drain field. The float 214 engages to cover 184 to establish a stop position in the closed position.

Accordingly, based on local conditions at the control box 142, the float rises in response to cavity liquid level throttling the valve closure limiting available flow to the connected drain field, and routing excess flow to the other fields or to the secondary distribution box, where flow is controlled in a like manner. In the event flow to both the primary and secondary distribution boxes is limited, the liquid level rises to the fitting 114 and excess flow is routed through line 130 to the secondary tank 128. The secondary tank 128 includes a float activated pump 220 that directs fluid to the tertiary distribution box 136 along supply line 150 and to avoid pressurization threat return excess fluid to the tank 128 along return line 152. The flow from the box 136 to the control boxes 142 associated with the drain fields 146 of the tertiary system is similar to the operation at the primary and secondary system 120, 126.

It will thus be appreciated that the systems are able to utilize the currently available capacities of the fields of the existing systems, and utilize the tertiary system only as required.

Figure 9:
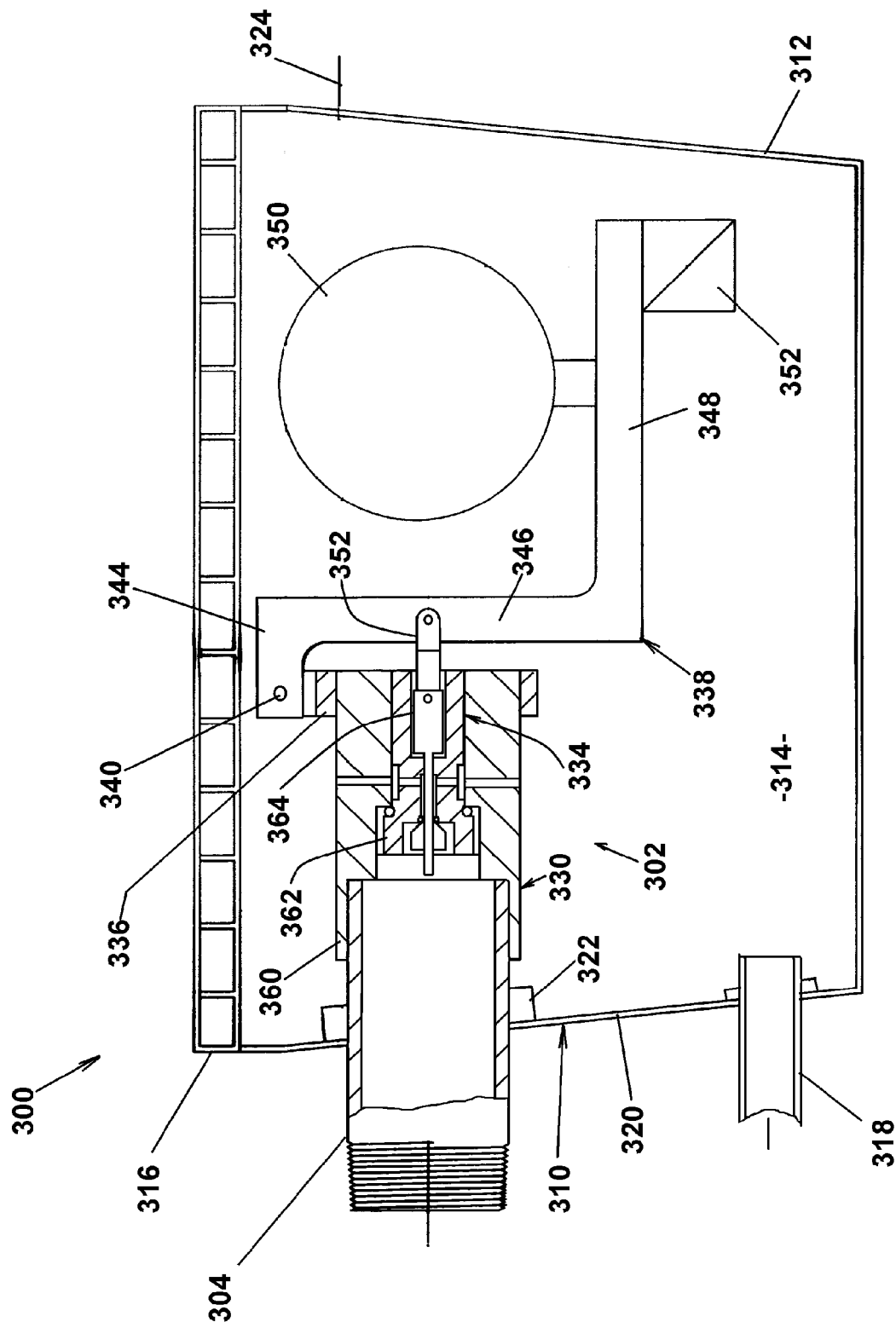
FIG. 9 is a cross sectional view of a control box in accordance with another embodiment of the invention with the float valve in the closed position.
Figure 10:
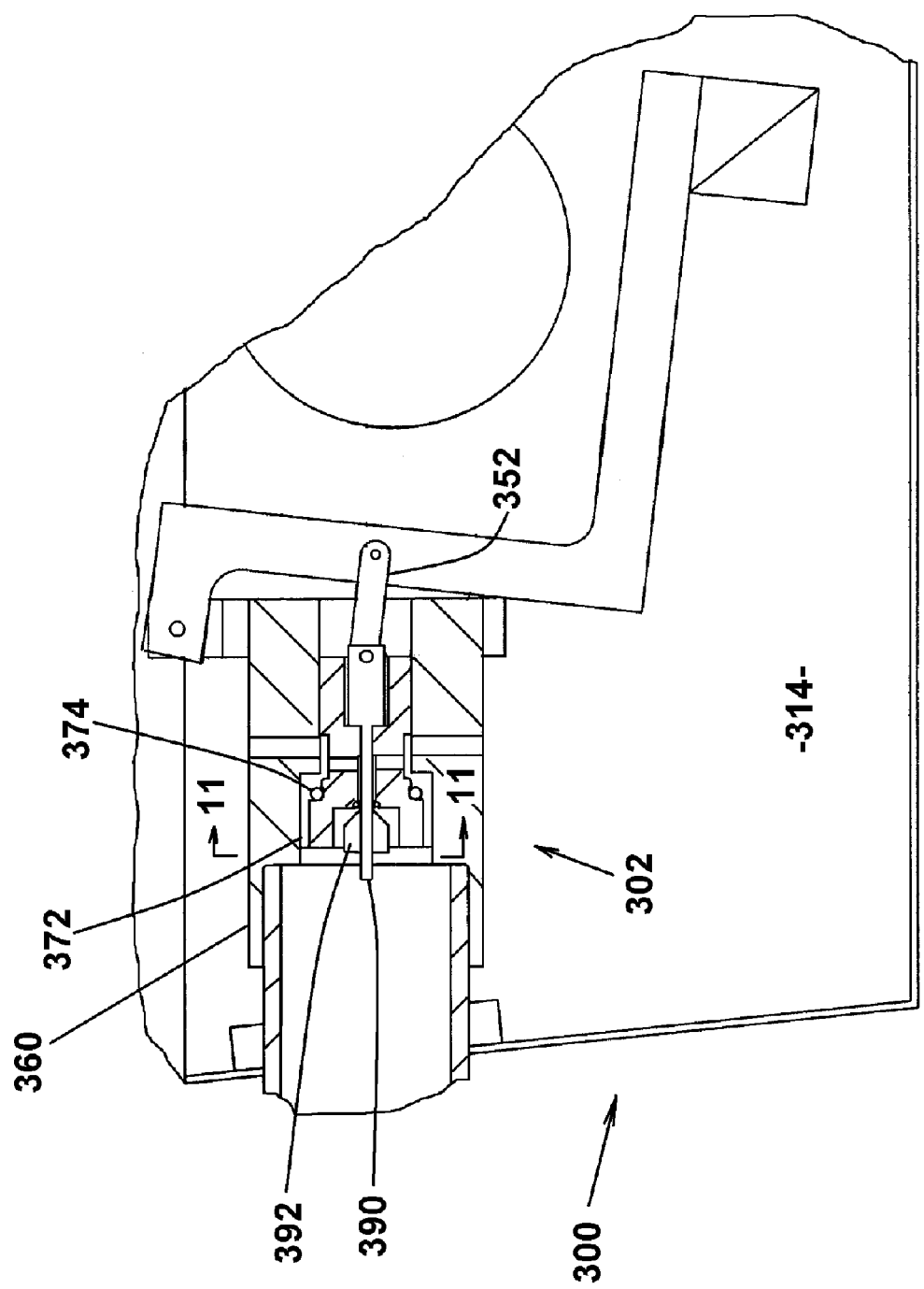
FIG. 10 is a fragmentary cross sectional view of the control box of FIG. 9 with the float valve in the open position.

Referring to FIGS. 9 and 10, there is shown a further embodiment of the invention. Therein, a control box 300 for the septic drain system is provided with a progressive float valve assembly 302 for regulating the flow of fluid from an intake line 304 connected to a distribution box as described above. As described below, the float valve assembly includes a pilot valve function that initially opens to relieve the hydrostatic pressure in the intake line, and a main valve function that provides for volumetric flow into the control box and outward to the drain field.

The control box 300 includes a thin wall enclosure or housing 310 having a base 312 defining an upwardly opening cavity 314, the upper end of which is sealed by a cover 316. A wall of the housing includes an opening connected with an outline line 318 leading to the drain field. The intake line 304 is mounted on an end wall 320 of the base 312 at a mounting flange 322 that is suitably mechanically or adhesively attached to the inner surface of the end wall 320. When the fluid in the cavity 314 is at level 324, the valve assembly 302 is in the closed position as shown in FIG. 9. As the fluid level decreases, the valve assembly 302 is progressively opened to the open position shown in FIG. 10.

The valve assembly 302 is mounted in the cavity 314 at the inner end of the intake line 304. The valve assembly 304 includes a valve body assembly 330 and a float arm assembly 332. The float arm assembly 332 actuates a slide valve assembly 334 in response to changing fluid levels in the cavity 314.

The float arm assembly 332 includes a pivot ring 336 mounted on the inner end of the valve assembly 302. A float arm 338 is pivotally attached to an upper end of the pivot ring 336 at pivot connection 340. The float arm 338 is generally Z-shaped and has a horizontal upper end 344 connected to the pivot ring 336 at the pivot connection 340, a vertical middle section 346, and a horizontal lower end 348 to which a float 350 is mounted at an upper surface and a counterweight 352 is attached at a lower surface. The middle arm 346 is connected to the slide valve assembly 334 at an actuating link 352.

The valve assembly 302 includes a cylindrical valve body 360 having a stepped counterbore axially therethrough. The outer counterbore telescopically receives the inner end of the intake pipe 304. The middle and inner bores slidably support the slide valve assembly 334.

Figure 11:
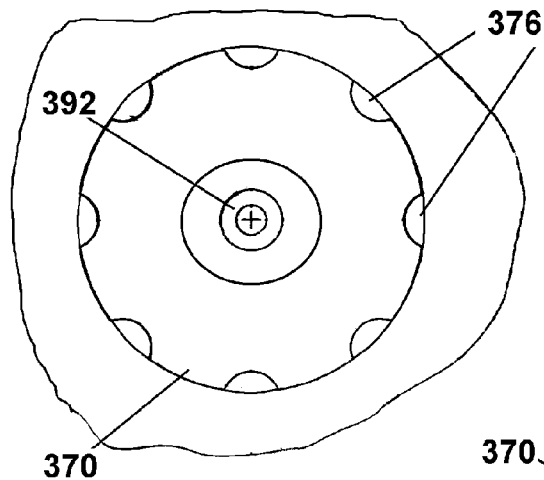
FIG. 11 is a view taken along line 11-11 in FIG. 10.

The slide valve assembly 334 includes an outer or main valve body 362 carrying a progressive valve assembly 364. The valve body 362 includes a front cylindrical collar 370 and a rear cylindrical shaft 372 slidably supported in the inner bore of the valve body 360. A sealing ring 374 is carried on the plug 372 adjacent the collar 370. As shown in FIG. 11, the collar 370 includes a circumferential series of axial grooves 376. In the open position shown in FIGS. 10 and 12, the sealing ring 374 is spaced from the base of the counterbore to permit flow through the grooves 376 in the direction of the arrows. In the closed position, the sealing ring 374 engages the base of the front counterbore to prevent flow.

Figure 12:
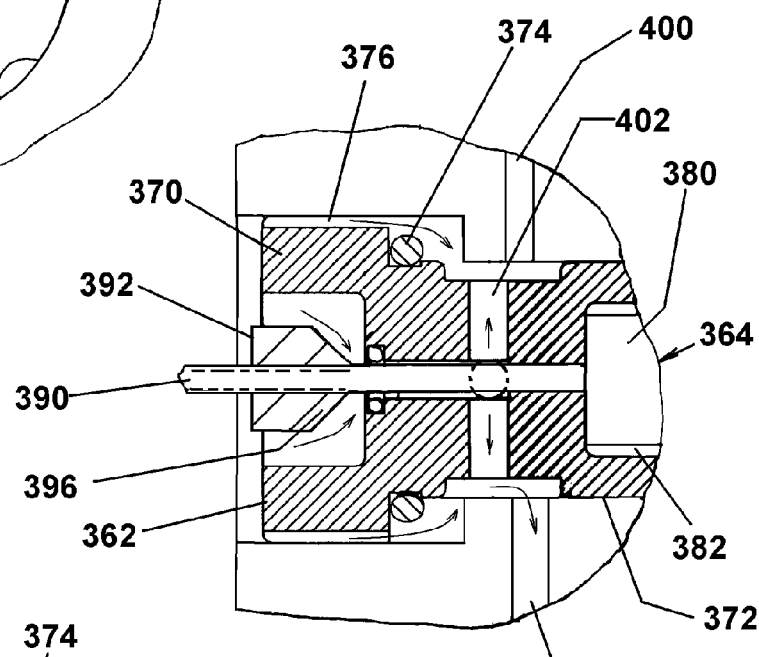
FIG. 12 is an enlarged fragmentary cross sectional view of the control box of FIG. 9 with the float valve in the closed position.
Figure 13:
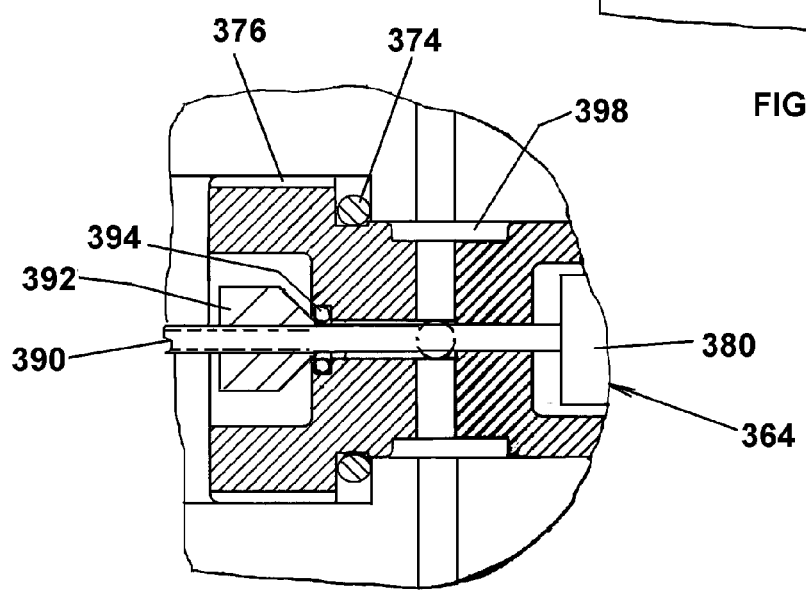
FIG. 13 is an enlarged fragmentary cross sectional view of the control box of FIG. 9 with the float valve in the open position.

As shown in FIGS. 12 and 13, the valve body 362 includes a stepped bore passage therethrough. The pilot valve assembly 364 includes a cylindrical plunger 380 supported in a rear counterbore 382 of the valve body. The link 352 is pivotally connected to the plunger 380 and the middle arm 346 of the lever arm assembly 332 as shown in FIGS. 9 and 10. The plunger 380 as shown in FIG. 13 is spaced from the base of the counterbore at a lost motion connection in the closed position. As shown in FIG. 12, the plunger 380 engages the base of the counterbore after initial opening movement to shift the valve body 362 to the open position for providing volumetric flow. The plunger 380 of the pilot valve assembly 364 includes a threaded shaft 390 extending axially through the center passage. A pilot valve 392 is adjustably threadably connected to the shaft 390. A sealing ring 394 having an inner diameter larger than the shaft 390 is retained in a groove at the base of the front counterbore. The pilot valve 392 includes a frustoconical tip 396 that engages the sealing ring 394 in the closed position of FIG. 13. In the open position as shown in FIG. 12, the tip 396 is spaced from the sealing ring 394 thereby allowing pilot flow in the direction of the arrows. The operation of the valves and the level 324 may be adjusted by axially shifting the pilot valve on the shaft 390. The plunger 380 includes an outer cylindrical groove 398. The valve body 362 includes radial ports 400 communicating with the groove 398 and allowing flow to the cavity 314 in the open position. An annular clearance is provided in the passage surrounding the shaft 390 and allows flow through ports 402 in the pilot valve assembly 364 in the open pilot position and the main valve position.

In operation, with the valve is in the open position wherein the float valve assembly 332 is in the lowered position shown of FIG. 10 and both the main valve and the pilot valve are in the open position, as the fluid level rises, the float 350 rises shifting the link 352 and moving the pilot valve 392 to the closed position blocking flow through the pilot passage. As the in the fluid level further rises, the linkage is further shifted whereby the valve 392 shifts the valve body 362 to the closed position. When the liquid level in the cavity drops, the pilot valve 392 initially opens bleeding the pressure in the intake line and thereafter, the main valve opens to resume flow in the reservoir and outwardly to the drain field.

It will thus be appreciated that the control box provides a progressive valving function to provide sensitive and positive response to changing fluid levels.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claim.

What is claimed is:

1. A septic system comprising;
a septic tank for discharging effluent to a first drain field having a plurality of first drain lines; and a flow control system including a control device operatively associated with each of said first drain lines for controlling the flow of effluent thereto, said control device having an enclosure having an internal cavity, a valve assembly associated with said enclosure having a flow passage with an inlet fluidly connected between the septic tank and said cavity and an outlet from said cavity connected to an associated drain line; a valve member in said flow passage having an open position permitting flow into said cavity and a closed position blocking said flow passage and flow into said cavity; a float member in said cavity connected with said valve member and operative to move said valve member from said open position toward said closed position in response to a raising of water level in said cavity caused by a reduction in flow capacity through said outlet to said associated drain line whereby effluent from said septic tank is routed to a control device and an associated first drain line remaining in an open position.

2. The septic system as recited in claim 1 wherein said valve assembly includes a valve body having a main flow passage fluidly connected at an inlet with said septic tank and at an outlet with said cavity; a main valve member slidably supported in said main flow passage in said valve body and having a closed position blocking flow in said main flow passage and an open position permitting flow in said main valve passage, said main valve member being operatively connected to said float member and being shifted by said float member to said closed position in response to said raising of water level in said cavity and shifted by said float member in response to lowering of water level in said cavity to said open position permitting flow through said main valve passage into said cavity.

3. The septic system as recited in claim 2 including a secondary flow passage in said valve body fluidly communicating with said inlet and said outlet, and a secondary valve member in said secondary flow passage moveable between a closed position blocking flow through said secondary flow passage and an open position permitting flow through said secondary flow passage, the secondary valve member being operatively connected to said float member so as to effect movement to said open position of said secondary valve member in advance of movement of said main valve member to said open position.

4. The septic system as recited in claim 1 wherein said valve assembly includes a valve body having vertical passage intersected by a horizontal passage having an inlet connected with said septic tank and said valve member is operatively connected to said float member and slidably supported in said vertical passage, said valve member being shifted by said float member to said closed position blocking said horizontal passage to limit said flow into said cavity in response to said raising of water level in said cavity and shifted by said float member to said open position in response to a lowering of the water level in said cavity permitting flow through said horizontal passage and said vertical passage into said cavity.

5. The septic system as recited in claim 1 wherein said system includes a first distribution means for routing the flow from the septic tank to each control device whereby closing of one valve assembly routs flow to the other valve assemblies.

6. The septic system as recited in claim 5 wherein said first distribution means establishes parallel connections with said first drain lines.

7. The septic system as recited in claim 5 wherein said septic system includes a second drain field having a plurality of second drain lines, each of said second drain lines having a control device connected thereto, and including second distribution means having outlets connected in parallel with said second drain lines and an inlet coupled with said first distribution means.

8. The septic system as recited in claim 7 wherein said distribution means comprise an enclosure having a cavity with outlets connected with the drain lines of an operatively associated drain field, and said first distribution means includes an inlet connected septic tank, and a connecting line connecting said first distribution means with said second distribution means, said connecting line being at a higher elevation than said outlets in said first distribution means whereby flow is directed to said second distribution means upon fluid level rise in said cavity of said first distribution means indicative of reduced flow capacity in said first drain field.

9. The septic system as recited in claim 8 including a tertiary septic tank fluidly connected between said septic tank and said distribution means for delivering effluent thereto, a tertiary drain field including a plurality of third drain lines disposed at a higher elevation than said first and second drain lines, pump means for delivering said effluent from said tertiary septic tank to said third drain lines wherein each of said third drain lines includes a control device associated therewith preventing flow thereto under ground saturation conditions thereat.

* * * * *